United States Patent Office 2,694,710
Patented Nov. 16, 1954

2,694,710

METHOD OF PURIFYING RAW FOLIC ACID

Gino Carrara and Vitangelo D'Amato, Milan, Italy, assignors to Lepetit S. p. A., Milan, Italy, a corporation of Italy No Drawing. Application April 1, 1949, Serial No. 85,033

Claims priority, application Italy December 1, 1948

2 Claims. (Cl. 260—251.5)

Processes are already known for preparing crude synthetic folic acid.

Reference may be made to the process disclosed by Patent 2,436,073 and our two co-pending applications of even date, Serial Nos. 85,031 and 85,032.

This invention relates to a process by which crude folic acid obtained by any of the known methods described in technical literature or in our above-mentioned applications, is purified.

By our process, purification of crude folic acid is extremely easy to carry out and strictly reduced liquid volumes (about 150 cubic centimeters to one gram of the product, that is, 70 times less than indicated in the literature) are employed, from which the folic acid contained therein is precipitated in hydrochloride form, unknown heretofore in literature or, though less conveniently, in sulphate form, likewise heretofore unknown in literature.

These salts are separated in a crystallised and sufficiently pure state in the treatment and may be easily converted into the pure acid by neutralising their 1% solution to pH 7, boiling the solution, thereby separating impurities in a gelatinous state. On filtering the boiling solution, the folic acid is precipitated while the solution is hot by acidification of the solution to pH 3.

The folic acid is then separated, after cooling the liquid, directly in a pure state.

We will describe by way of example a manner of purifying crude folic acid according to our improved method.

One part crude folic acid is dissolved in four parts hydrochloric 5 N acid. The solution obtained is rapidly filtered and admixed with 4 parts water. It is then allowed to rest during 24 hours at 15° C., whereby the hydrochloride of the folic acid is crystallised. The hydrochloride output varies obviously in accordance with the folic acid percentage contained in the crude product and increases as said percentage rises, the loss being practically due to the solubility of hydrochloride of folic acid in the diluted hydrochloric acid from which it is separated. The resulting hydrochloride is of crystalline aspect, yellow-green in colour and contains one molecule of HCl to one molecule of folic acid. The resulting hydrochloride is suspended in 100 parts water and admixed with ammonia to a pH 8, beaten to solution, pH being returned to 6–6.3, and boiled; the solution is filtered at boiling temperature from the small quantity of precipitate formed and the hot solution is acidified to pH 3. It is cooled during some hours and pure folic acid is collected.

The total yield from the crude folic acid may attain 70–75%, the crude product having contained up to 15% folic acid.

A similar process may be employed by using sulphuric instead of hydrochloric acid.

What we claim is:

1. Method of purifying crude folic acid, comprising dissolving one part of crude folic acid in about 4 parts of 5 N hydrochloric acid, rapidly filtering the resulting solution, mixing the filtrate with about 4 parts of water and allowing the solution to rest at about 15° C. until the hydrochloride of folic acid crystallizes out, suspending the hydrochloride so obtained in about 100 parts of water, adding an inorganic base to the supension to a pH value of about 8, beating the suspension to solution, adjusting the solution to a pH value of about 6–6.3, boiling the solution, filtering the same, acidifying the solution while it is hot to a pH value of about 3, cooling the solution and collecting the substantially pure folic acid which precipitates.

2. Method according to claim 1 wherein the inorganic base is ammonia.

References Cited in the file of this patent

UNITED STATES PATENTS

| Number | Name | Date |
|---|---|---|
| 2,466,665 | Waller | Apr. 5, 1949 |
| 2,474,022 | Waller et al. | June 21, 1949 |
| 2,476,360 | Daub et al. | July 19, 1949 |
| 2,500,296 | Waller et al. | Mar. 14, 1950 |